(12) United States Patent
Hwang et al.

(10) Patent No.: US 8,138,711 B2
(45) Date of Patent: Mar. 20, 2012

(54) MOTOR CONTROLLER OF AIR CONDITIONER AND METHOD OF THE MOTOR CONTROLLER

(75) Inventors: Sun Ho Hwang, Changwon-si (KR); Han Su Jung, Changwon-si (KR); Chung Hun Lee, Changwon-si (KR)

(73) Assignee: LG Electronics, Inc., Seoul (KR)

( * ) Notice: Subject to any disclaimer, the term of this patent is extended or adjusted under 35 U.S.C. 154(b) by 751 days.

(21) Appl. No.: 12/285,948

(22) Filed: Oct. 16, 2008

(65) Prior Publication Data

US 2009/0102405 A1    Apr. 23, 2009

(30) Foreign Application Priority Data

Oct. 18, 2007 (KR) .................. 10-2007-0105158

(51) Int. Cl.
*H02P 27/04* (2006.01)
(52) U.S. Cl. .................. 318/807; 318/801; 318/471
(58) Field of Classification Search .................. 318/788, 318/779, 799, 807, 801, 471, 503, 641, 708; 165/253, 257, 287, 288, 289
See application file for complete search history.

(56) References Cited

U.S. PATENT DOCUMENTS

| | | | | |
|---|---|---|---|---|
| 4,736,595 A * | 4/1988 | Kato | .................. | 62/160 |
| 5,247,237 A * | 9/1993 | Koyama et al. | .................. | 318/808 |
| 5,828,200 A | 10/1998 | Ligman et al. | | |
| 5,959,428 A * | 9/1999 | Saito et al. | .................. | 318/705 |
| 7,221,121 B2 * | 5/2007 | Skaug et al. | .................. | 318/807 |
| 7,650,760 B2 * | 1/2010 | Nakata et al. | .................. | 62/228.1 |
| 7,663,329 B2 * | 2/2010 | Muta | .................. | 318/432 |
| 7,669,430 B2 * | 3/2010 | Matsui et al. | .................. | 62/87 |
| 2005/0204760 A1 | 9/2005 | Kurita et al. | | |
| 2006/0130504 A1* | 6/2006 | Agrawal et al. | .................. | 62/228.4 |
| 2008/0072619 A1* | 3/2008 | Nojima et al. | .................. | 62/498 |

FOREIGN PATENT DOCUMENTS

| | | |
|---|---|---|
| JP | 1-227664 | 9/1989 |
| JP | 3-218296 | 9/1991 |

* cited by examiner

*Primary Examiner* — Walter Benson
*Assistant Examiner* — Antony M Paul
(74) *Attorney, Agent, or Firm* — McKenna Long & Aldridge LLP

(57) ABSTRACT

The present invention relates to a motor controller for an air conditioner and a motor control method. The motor controller including a converter converting AC utility power into DC power and an inverter having a plurality of switching elements, the inverter receiving the DC power, converting the received DC power into AC power by switching operations of the switching elements, and supplies the AC power to a motor, the motor controller further including: a current detector detecting a current flowing in the motor controller; a temperature detector detecting a temperature in the motor controller or a temperature ambient to the motor controller; and a controller calculating a loading based on at least one of room temperature, setup temperature, and inner unit capacity and setting up a final target frequency for driving the motor based on the calculated loading and at least one of the detected current and the detected temperature. The motor controller for the air conditioner and the motor control method determines a target frequency considering a current and a temperature, to reduce power consumption and protect circuit elements.

14 Claims, 9 Drawing Sheets

【Figure 1】
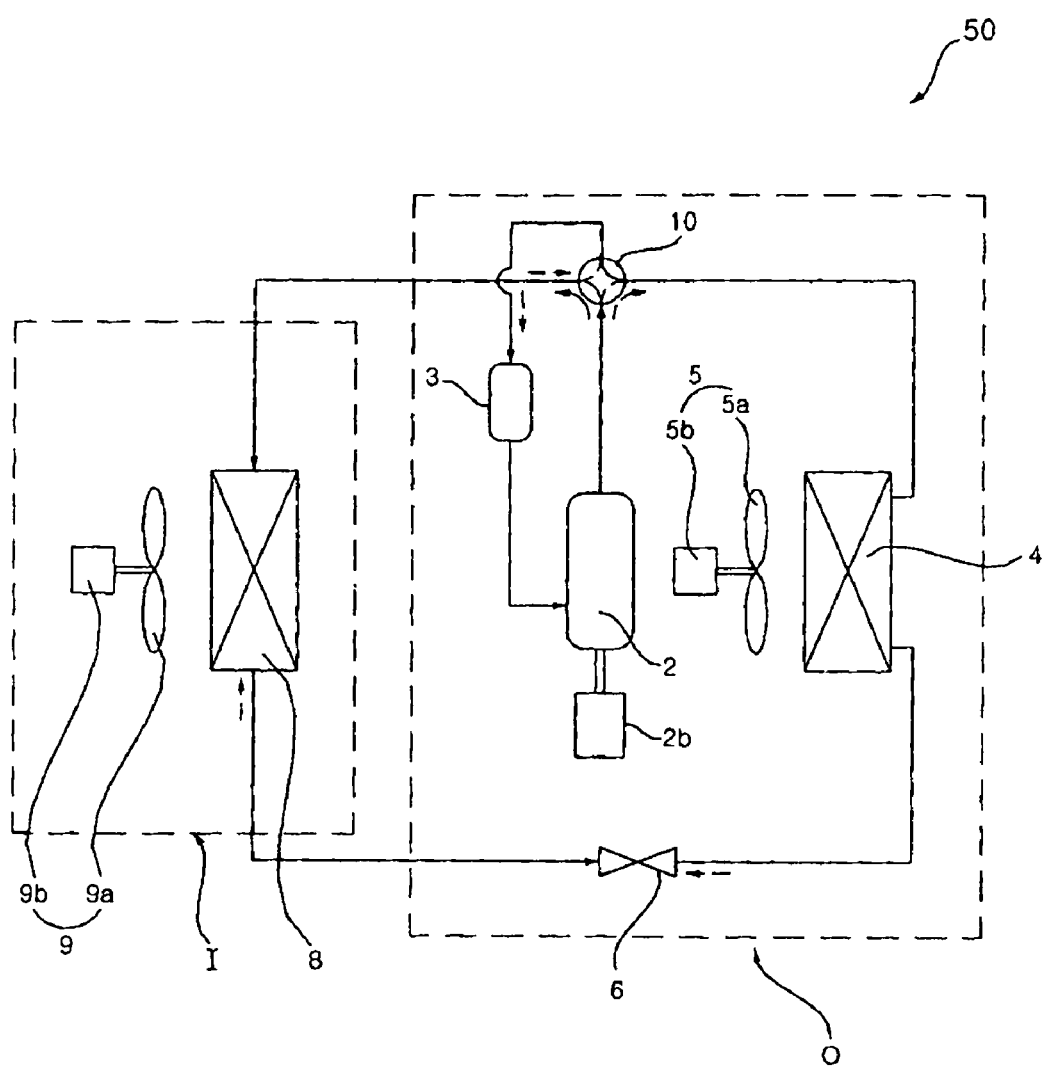

[Figure 2]
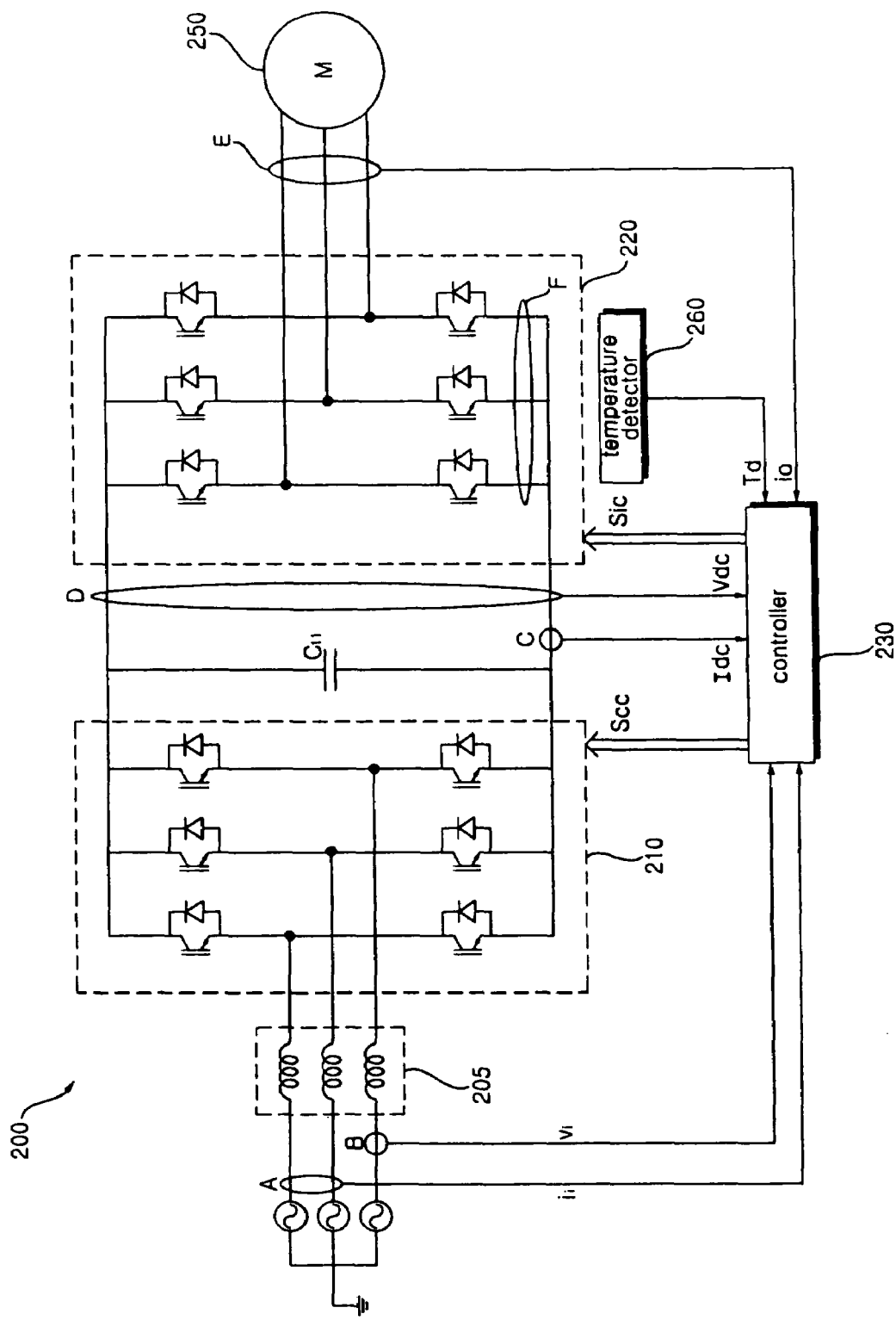

[Figure 3]
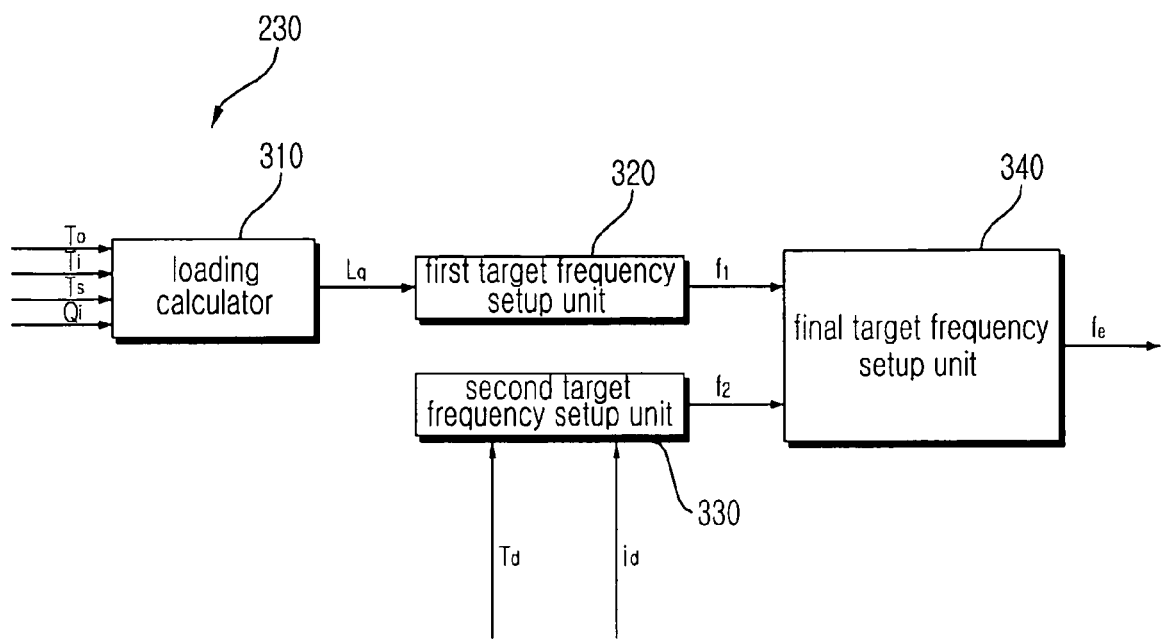

[Figure 4]
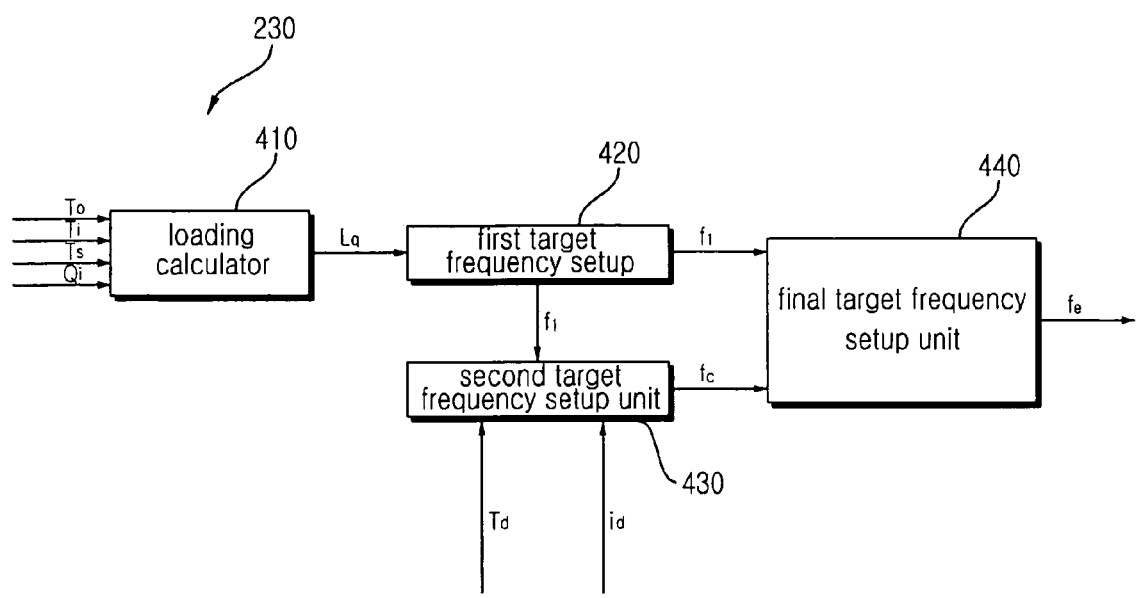

[Figure 5]
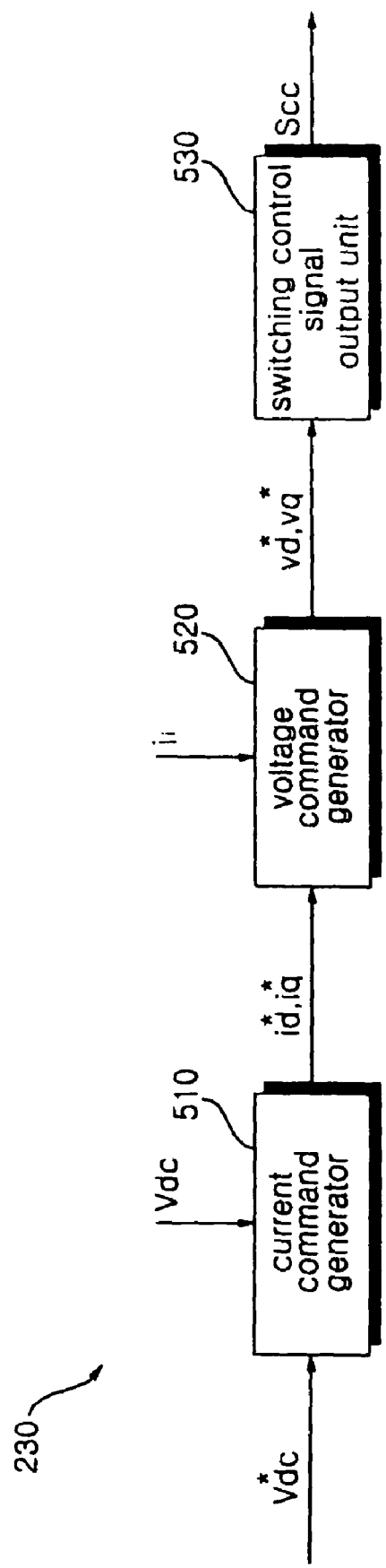

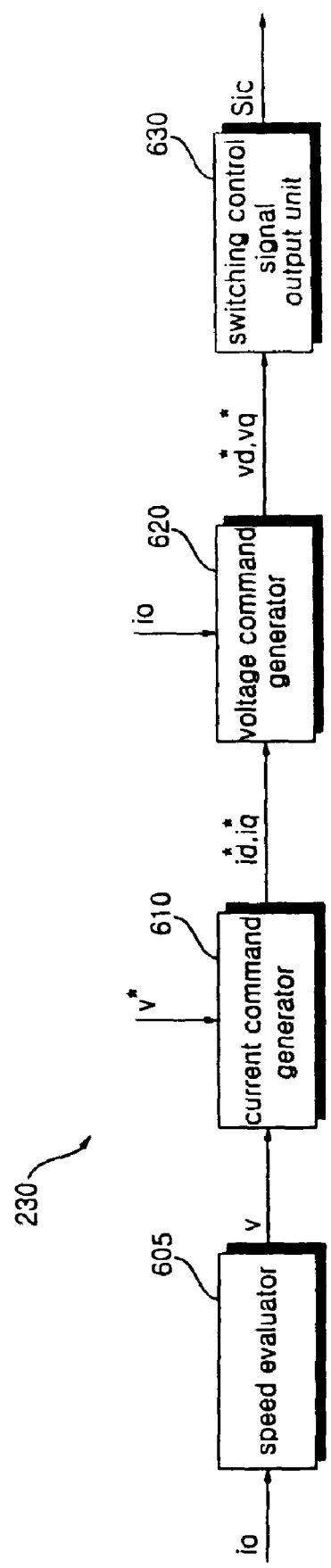
[Figure 6]

[Figure 7]
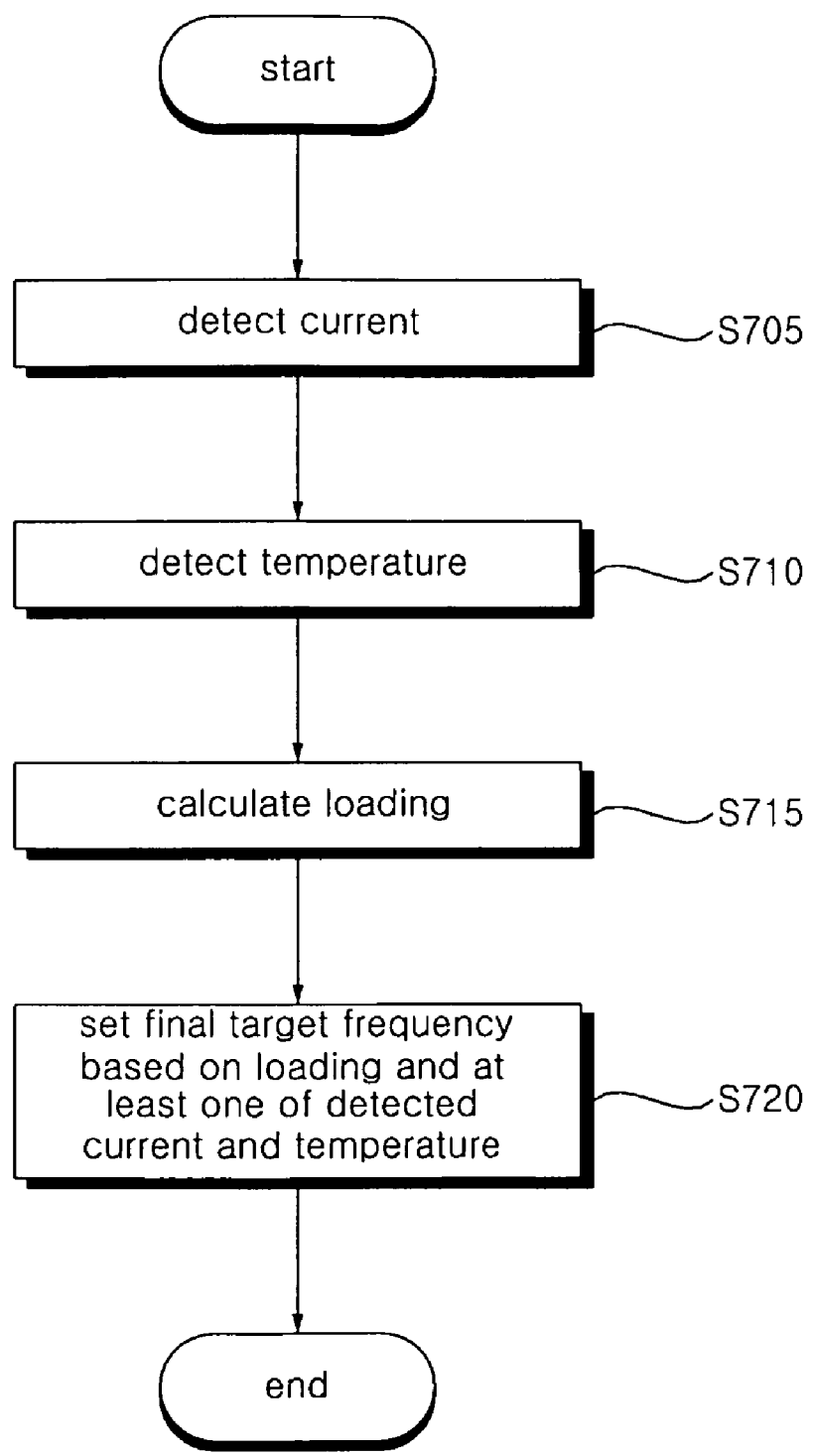

[Figure 8]
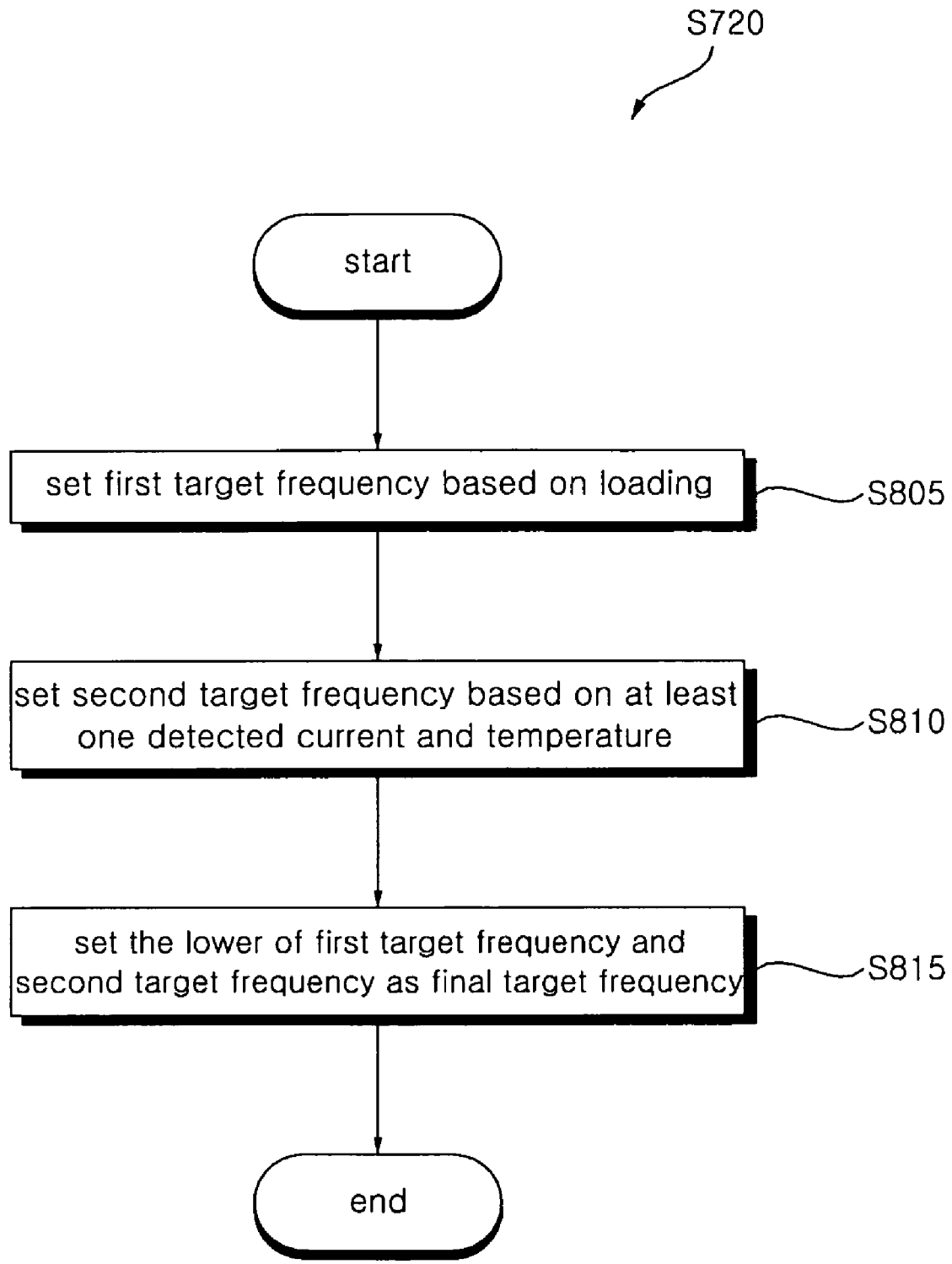

[Figure 9]
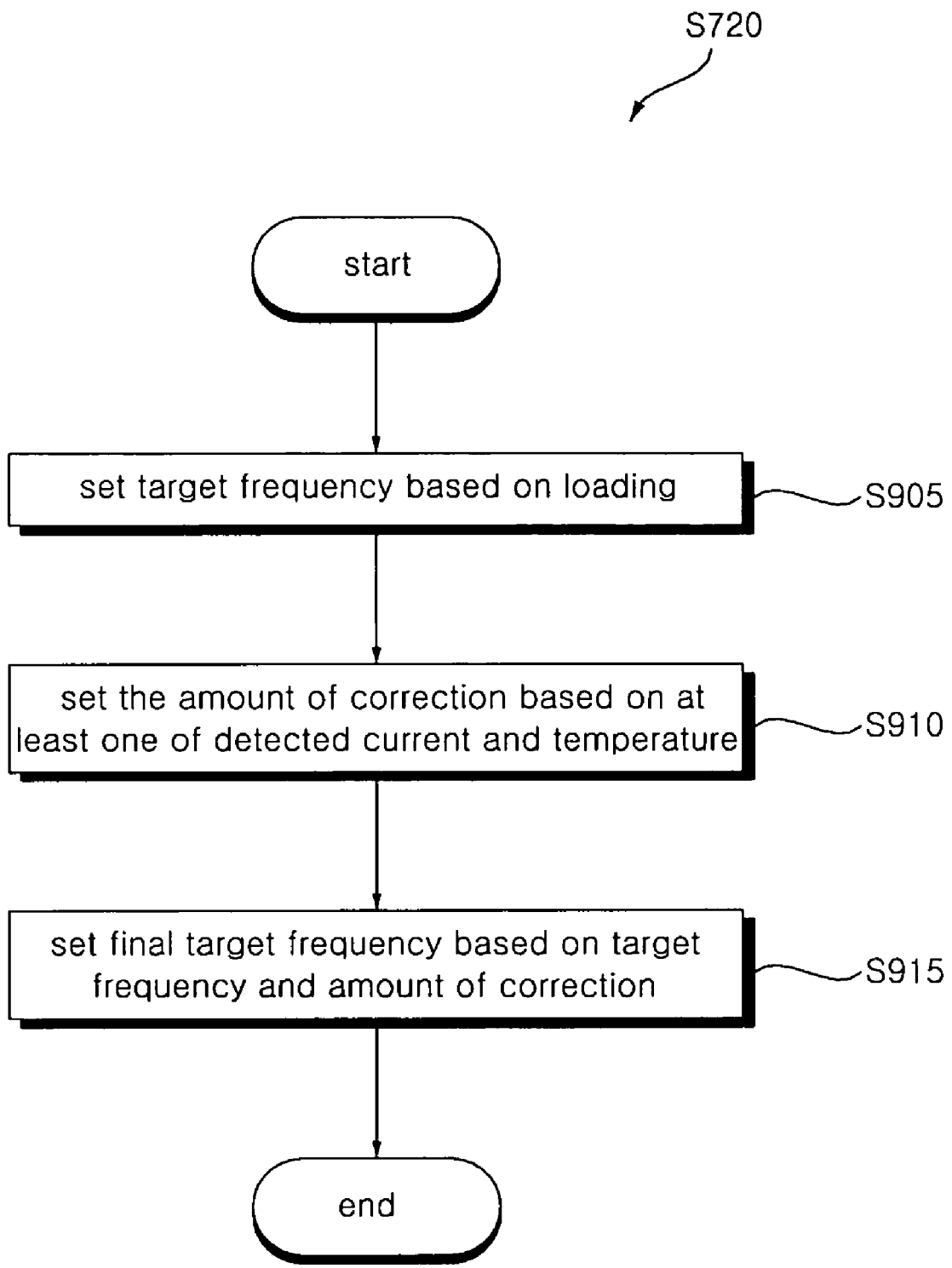

MOTOR CONTROLLER OF AIR CONDITIONER AND METHOD OF THE MOTOR CONTROLLER

CROSS-REFERENCE TO RELATED APPLICATION

This application claims the benefit of Korean Patent Application No. 10-2007-0105158, filed on Oct. 18, 2007, which is hereby incorporated by reference in its entirety as if fully set forth herein.

TECHNICAL FIELD

The present invention relates to a motor controller for an air conditioner and a motor control method, especially which is capable of setting up a target frequency of a motor based on the temperature and current of the motor controller in order to prevent the overheat of circuit components included in the motor controller for the air conditioner.

BACKGROUND ART

Air conditioners are generally arranged in a certain space, such as rooms, living rooms, offices, and stores, to adjust the temperature, moisture, clearness, and air flow to maintain inner environment clean and fresh.

An air conditioner may be commonly classified into an integral type and a stand-alone type. Both types are the same in their functions. In the integral type air conditioner, however, a cooling function has been integrated with a heating function, and the air conditioner is mounted on the wall or window. On the contrary, the stand-alone type air conditioner includes an indoor unit and an outdoor unit that are provided separately from each other. The indoor unit is located indoors for providing heating and cooling. The outdoor unit is located outdoors for heat dissipation and compression. The indoor unit is coupled with the outdoor unit via a refrigerant pipe.

An air conditioner includes a motor used for a compressor or fan, and a motor controller for driving the motor. The motor controller converts AC utility power into DC power and then AC power having a constant frequency.

A typical air conditioner calculates a loading from the difference between room temperature and setup temperature to drive the compressor with a predetermined frequency based on the amount of load. The operation frequency of the compressor is set up to increase as the loading is high.

However, if the amount of load is over a predetermined level, the motor driving device, especially circuit elements included in the inverter, may be damaged, which causes unstable operations. Furthermore, various factors are not considered that affects a real loading, and this interferes with the efficient driving of the compressor according to the real variation in the amount of load.

DISCLOSURE

Technical Problem

An object of the present invention is to provide a motor controller for an air conditioner and a motor control method, which are capable of reducing power loss and protecting circuit elements by determining a target frequency considering current and temperature in the motor controller for the air conditioner.

Technical Solution

A motor controller for an air conditioner according to an exemplary embodiment of the present invention including a converter converting AC utility power into DC power and an inverter having a plurality of switching elements, the inverter receiving the DC power, converting the received DC power into AC power by switching operations of the switching elements, and supplies the AC power to a motor, the motor controller further includes: a current detector detecting a current flowing in the motor controller; a temperature detector detecting a temperature in the motor controller or a temperature ambient to the motor controller; and a controller calculating a loading based on at least one of room temperature, setup temperature, and inner unit capacity and setting up a final target frequency for driving the motor based on the calculated loading and at least one of the detected current and the detected temperature.

A method of controlling a motor by a motor controller for an air conditioner according to an exemplary embodiment of the present invention, the motor controller including a converter converting AC utility power into DC power and an inverter having a plurality of switching elements, the inverter receiving the DC power, converting the received DC power into AC power by switching operations of the switching elements, and supplies the AC power to a motor, the method includes: detecting a current flowing in the motor controller; detecting a temperature in the motor controller or a temperature ambient to the motor controller; calculating a loading based on at least one of room temperature, setup temperature, and inner unit capacity; and setting up a final target frequency for driving the motor based on the calculated loading and at least one of the detected current and the detected temperature.

ADVANTAGEOUS EFFECTS

The motor controller for the air conditioner and the motor control method according to exemplary embodiments of the present invention may reduce power loss and protect circuit elements by determining a target frequency considering current and temperature in the motor controller for the air conditioner. Moreover, motor controller for the air conditioner and the motor control method according to exemplary embodiments of the present invention may accomplish a fresh, air conditioned environment by setting up a compression capacity considering the real load applied to the air conditioner.

DESCRIPTION OF DRAWINGS

FIG. 1 is a view schematically illustrating an air conditioner associated with the present invention.

FIG. 2 is a block diagram of a motor controller for an air conditioner according to an exemplary embodiment of the present invention.

FIG. 3 is a block diagram illustrating a controller according to an exemplary embodiment of the present invention.

FIG. 4 is a block diagram illustrating a controller according to an exemplary embodiment of the present invention.

FIG. 5 is a block diagram illustrating a controller according to an exemplary embodiment of the present invention.

FIG. 6 is a block diagram illustrating a controller according to an exemplary embodiment of the present invention.

FIG. 7 is a flowchart illustrating a method of controlling a motor for an air conditioner according to an exemplary embodiment of the present invention.

FIG. 8 is a flowchart illustrating a method of setting up the final target frequency of FIG. 7 according to an exemplary embodiment of the present invention.

FIG. 9 is a flowchart illustrating a method of setting up the final target frequency of FIG. 7 according to an exemplary embodiment of the present invention.

MODE FOR INVENTION

Hereinafter, exemplary embodiments of the present invention will be described in more detail with reference to accompanying drawings.

FIG. 1 is a view schematically illustrating an air conditioner according to an exemplary embodiment of the present invention.

Referring to FIG. 1, the air conditioner 50 includes an inner unit I and an outdoor unit O.

The outdoor unit O includes a compressor 2, a first motor 2b for compressor, an outdoor heat exchanger 4, an outdoor air blower 5, an expander 6, a cooling/heating switching valve 10, and accumulator 3. The compressor 2 compresses coolant. The first motor 2b drives the compressor 2. The outdoor heat exchanger 4 dissipates the heat emanating from the compressed coolant. The outdoor air blower 5 includes an outdoor fan 5a located at a side of the heat exchanger 5 to promote the heat dissipation of the coolant and a second motor 5b to rotate the outdoor fan 5a. The expander 6 expands the compressed coolant. The cooling/heating switching valve 10 switches a flow path of the compressed coolant into another. The accumulator 3 stores vaporized coolant for a moment to eliminate moisture and unwanted materials, and supplies the coolant with constant pressure to the compressor 2.

The inner unit I includes an inner heat exchanger 8 and an inner air blower 9. The inner heat exchanger 8 is located indoors to perform cooling/heating. The inner air blower 9 includes an inner fan 9a located in a side of the inner heat exchanger 8 to promote the heat dissipation of the coolant, and a third motor 9b to rotate the inner fan 9a.

There could be provided at least one inner heat exchanger 8. The compressor 2 may be at least one of an inverter compressor and a constant-velocity compressor. The air conditioner 50 may be configured as a cooler for cooling, or as a heat pump for cooling or heating.

A motor associated with the motor controller for the air conditioner according to the exemplary embodiment of the present invention may be the motors 2b, 5b, and 9b for operating the outdoor fan, the compressor, and the inner fan, respectively.

FIG. 2 is a block diagram of a motor controller for an air conditioner according to an exemplary embodiment of the present invention.

Referring to FIG. 2, the motor controller 200 includes a converter 210, an inverter 220, a controller 230, a current detecting unit, and a temperature detecting unit 260. The motor controller 200 may further include a reactor 205 and a smoothing capacitor C11.

The reactor 205 transmits AC utility power to the converter 210. In a case where the converter 210 includes plural switching elements for converter as shown in FIG. 2, the reactor 205 boosts up AC utility power in association with the converter 210 and supplies the boosted AC utility power to the converter 210. More specifically, in boosting, the reactor 205 stores the AC power by Ons/Offs of the switching elements, and then supplies the AC power to the converter 210. In addition, the reactor 205 is used to corrector power factor of the AC power and eliminate harmonics generated between a three-phase power source and the converter 210 to protect a system or converting element.

The AC utility power source may be a single-phase AC power source or a three-phase AC power source. A three-phase AC power source has been shown in FIG. 2. If the AC utility power source is a three-phase AC power source, the reactor 205 may be replaced by a common-mode LCL filter. The common-mode LCL filter is composed of inductors and capacitors that are connected to a common node. The harmonic current generated upon high-speed switching is limited by capacitor components of the common-mode LCL filter.

The converter 210 converts the AC utility power transmitted from the reactor 205 into DC power. Although the converter includes a plurality of switching elements in FIG. 2, the present invention is not limited thereto. For example, the converter may include only diodes. As shown in FIG. 2, the converter 210 has plural switching elements for converter, and converts the three-phase AC power transmitted through the reactor 205 into DC power by Ons/Offs of the switching elements. More specifically, the converter 210 includes total three pairs of switching elements, each pair consisting of an upper switching element and a lower switching element connected in series with the upper switching element, the three pairs connected parallel with each other. Each switching element is connected parallel with a diode.

The smoothing capacitor C11 is connected to an output terminal of the converter 210. The smoothing capacitor C11 serves to smooth the converted DC power outputted from the converter 210. Hereinafter, the output terminal of the converter 210 is referred to as "dc terminal" or "dc link terminal". The smoothed DC power is applied to the inverter 220.

The inverter 220 includes plural switching elements for inverter, and converts the smoothed DC power into three-phase AC power having a prescribed frequency by Ons/Offs of the switching elements. More specifically, the inverter 220 includes total three pairs of switching elements, each pair consisting of an upper switching element and a lower switching element connected in series with the upper switching element, the three pairs connected parallel with each other.

The three-phase AC power outputted from the inverter 220 is applied to each terminal of the three-phase motor 250. The three-phase motor 250 includes a stator and a rotator, wherein the rotator rotates when AC power is applied to each terminal of the three-phase motor 250 connected to coils wound in the stator. The three-phase motor 250 may include a BLDC motor and a synRM motor. On the other hand, the three-phase motor 250 may be the motor 2b used for the compressor included in the air conditioner or the motors 5b and 9b used for driving fans.

The controller 230 calculates a loading based on at least one of room temperature, setup temperature, and inner unit capacity, and sets up a final target frequency for driving the motor based on the calculated amount of load and at least one of current detected by the current detector and temperature detected by the temperature detector 260.

In addition, the controller 230 may output a switching control signal Scc for controlling the converter. The switching control signal Scc is a switching control signal for PWM, and this switching control signal Scc is generated based on a voltage detected at dc terminal, and outputted to the converter 210. If the switching control signal Scc is inputted to the gate terminal of each switching element included in the converter 210, each switching element performs a switching operation. Accordingly, power factor may be controlled, and the three-phase AC power is converted into DC power.

In addition, the controller 230 may output a switching control signal Sic for controlling the inverter. The switching control signal Sic is a switching control signal for PWM, and this switching control signal Sic is generated based on a current flowing through an output terminal of the inverter 220, and outputted to the inverter 220. If the switching control signal Sic is inputted to the gate terminal of each switching element included in the inverter 220, each switching element performs a switching operation. Accordingly, three-phase AC power with a prescribed frequency is outputted.

An additional description of the controller 230 will be made later with reference to FIGS. 3 to 6.

The current detector detects current flowing in the motor controller. For example, the current detector may be an input current detector A that detects an input current ii supplied from the AC utility power source. The input current detector A may be located between the three-phase AC power source and the reactor 205, and the input current detector A may include a current sensor, a current transformer (CT), and a shunt resistor for current detection.

The current detector may be a dc terminal current detector C that detects a current Idc flowing at the dc terminal. Assuming the dc terminal is located between a first bus bar and a second bus bar, the dc terminal current detector C may be located at the second bus bar, and the dc terminal current detector C may include a current censor, a current transformer (CT), and a shunt resistor for current detection.

The current detector may be an output current detector E or F that detects an output current io applied to the motor. The output current detector E may be located between the inverter 220 and the motor 250, and the output current detector E may include a current sensor, a current transformer (CT), and a shunt resistor for current detection. The output current detector F may be a current sensor located in the motor 250. The output current detector E may be a shunt resistor one end of which is connected to a common terminal of the three lower switching elements included in the inverter.

At least one of the detected input current ii, the dc terminal current idc, and the output current io is inputted to the controller 230, and the currents ii, idc, and io are used to set up a final target frequency for motor-driving. And, the currents ii, idc, and io may be used to protect the converter 210 or inverter 220 from over-current or low-current.

The temperature detector 260 detects the temperature in the motor controller or temperature Td ambient to the motor controller. For example, the temperature detector 260 may be an inverter temperature detector that detects the temperature of the switching elements included in the inverter. For example, the temperature detector 260 may be a heat spreader temperature detector that detects the temperature of a heat spreader mounted in the inverter. In addition, the temperature detector 260 may be a coolant discharging temperature detector that detects the temperature of the coolant discharged from the compressor. And, the temperature detector 260 may be a converter temperature detector that detects the temperature of the switching elements included in the converter. The temperature detector 260 may be an outdoor unit temperature detector that detects the temperature of the outdoor unit. The temperature detector 260 may be any one of temperature detectors that detect the temperature of the outdoor heat exchanger, the inlet of the pipe connected to the outdoor heat exchanger, and the outlet of the pipe connected to the outdoor heat exchanger.

The detected temperature Td is inputted to the controller 230 and used to set up a final target frequency for motor driving.

The motor controller for the air conditioner according to an exemplary embodiment of the present invention may further include an input voltage detector B that detects an input voltage vi supplied from the AC utility power source. The input voltage detector B may be located between the AC utility power source and the reactor 205, and the input voltage detector B may include a resistor for voltage detection. The detected input voltage is inputted to the controller 230 and used to protect the converter 210 or inverter 220 from over-voltage or low-voltage.

The motor controller 200 for the air conditioner according to an exemplary embodiment of the present invention may further include a dc terminal voltage detector D that detects a voltage applied to the dc terminal. The dc terminal voltage detector D may include a resistor. The detected dc terminal voltage Vdc is applied to the controller 230 and used for switching operations of the converter.

FIG. 3 is a block diagram illustrating a controller according to an exemplary embodiment of the present invention.

Referring to FIG. 3, the controller 230 includes a loading calculator 310, a first target frequency setup unit 320, a second target frequency setup unit 330, and a final frequency setup unit 340. The loading calculator 310 calculates a loading Lq. The first target frequency setup unit 320 sets up a first target frequency f1 based on the calculated loading. The second target frequency setup unit 330 sets up a second target frequency f2 based on at least one of a detected current id and a detected temperature Td. The final target frequency setup unit 340 sets up the lower one of the first target frequency f1 and the second target frequency f2 as a final target frequency fe.

Hereinafter, the description will focus on the determination of the final target frequency upon cooling.

The loading calculator 310 calculates the loading Lq based on at least one of room temperature Ti, setup temperature Ts, and indoor unit capacity Qi. The loading Lq increases as the difference between the setup temperature Ts and the room temperature Ti increases or the inner unit capacity Qi increases. The loading calculator 310 may calculate the loading further considering outdoor temperature. For example, the loading calculator 310 may calculate the loading so that as the outdoor temperature To increases, the loading Lq increases accordingly, and as the outdoor temperature To decreases, the loading Lq decreases accordingly.

The first target frequency setup unit 320 sets up the first target frequency f1 based on the loading Lq. The first target frequency setup unit 320 sets up the first target frequency f1 so that as the loading Lq increases, the first target frequency f1 increases accordingly, and as the loading Lq decreases, the first target frequency f1 decreases accordingly. In addition, the first target frequency f1 may be set up in proportion to the loading Lq or such that the loading Lq is sectionalized and the first target frequency f1 changes for each section of the sectionalized loading Lq.

The second target frequency setup unit 330 sets up the second target frequency f2 so that the second target frequency f2 decreases in case that the detected current id is larger than a prescribed value. In addition, the second target frequency f2 may be set up in inverse-proportion to the loading Lq or such that the detected current id is sectionalized and the second target frequency f2 changes for each section of the sectionalized current id. The second target frequency f2 may be set up to be equal to the first target frequency f1 in case that the detected current id is lower than a prescribed value.

The detected current id may be at least one of input current ii, dc terminal current idc, and output current io. If the detected current id is larger than a prescribed value, power consumption increases, the circuit elements included in the converter 210 and inverter 220 may be damaged, and it could be difficult for the motor to operate at the setup target frequency. Therefore, the second target frequency f2 may be set up to be lowered.

In a case where the detected temperature Td is larger than a prescribed value, the second target frequency setup unit 330 may set up the second target frequency f2 so that the second target frequency f2 is lowered. In addition, the second target frequency f2 may be set up in inverse-proportion to the detected temperature Td or such that the detected temperature Td is sectionalized and the second target frequency f2 changes for each section of the sectionalized temperature Td. This allows the elements included in the motor controller to be protected in a case where the temperature in the motor controller or the temperature Td ambient to the motor controller is larger than a prescribed value. The second target frequency f2 may be set up to be equal to the first target frequency f1 in case that the detected temperature Td is lower than a prescribed value.

The second target frequency setup unit 330 may set up the second target frequency f2 based on both the detected current id and the detected temperature Td. The second target frequency setup unit 330 may set up the second target frequency f2 corresponding to at least one of the detected current id and the detected temperature Td using a table stored previously therein.

The final target frequency setup unit 340 compares the first target frequency f1 and the second target frequency f2 to each other and sets up the lower of the two frequencies f1 and f2 as the final target frequency fe. Accordingly, the final target frequency fe may be set up considering the temperature in the motor controller or the temperature Td ambient to the motor controller as well as the current id flowing in the motor controller, and therefore, the circuit elements included in the motor controller may be adapted to stably operate without respect to the current Id and temperature Td.

FIG. 4 is a block diagram illustrating a controller according to an exemplary embodiment of the present invention.

Referring to FIG. 4, the controller 230 includes a load calculator 410, a first target frequency setup unit 420, a target frequency correction unit 430, and a final frequency setup unit 440. The load calculator 410 calculates a loading Lq. The first target frequency setup unit 420 sets up a first target frequency f1 based on the calculated loading. The target frequency correction unit 430 sets up an amount of correction of the first target frequency f1 based on at least one of a detected current id and a detected temperature Td. The final target frequency setup unit 440 sets up a final target frequency fe based on the first target frequency f1 and the amount of correction.

Operations of the loading calculator 410 and the first target frequency setup unit 420 are equal to those of the loading calculator 310 and the first target frequency setup unit 320 shown in FIG. 3.

The target frequency correction unit 430 sets up the amount of correction fc so that the amount of correction fc increases in case that the detected current id or the detected temperature Td is larger than a prescribed value. The amount of correction fc may be less than 0. In a case where the detected current id or the detected temperature Td is smaller than a prescribed value, the amount of correction fc may be equal to 0. As described above with reference to FIG. 3, the current id or temperature Td may be sectionalized to have a few sections, and then, the amount of correction fc may be set up for each section of the sectionalized current id or temperature Td.

The target frequency correction unit 430 may set up the amount of correction considering both the current id and temperature Td. The target frequency correction unit 430 may also set up the amount of correction corresponding to at least one of the current id and the temperature Td using the table stored previously therein.

The final target frequency setup unit 440 sums the first target frequency f1 from the first target frequency setup unit 420 and the amount of correction fc from the target frequency correction unit 430 to set up the final target frequency fe.

FIG. 5 is a block diagram illustrating a controller according to an exemplary embodiment of the present invention.

Referring to FIG. 5, the controller 230 may function as a converter micom that controls the converter 210. The controller 230 may further include a current command generator 510, a voltage command generator 520, and a switching control signal output unit 530.

The current command generator 510 generates current commands $i^*d, i^*q$ based on a detected dc terminal voltage Vdc and a dc voltage command $V^*dc$. The current command generator 510 may include a PI controller (not shown) and a d,q-axis current command limiting unit (not shown). The PI controller generates d,q-axis current commands $i^*d, i^*q$ based on the detected dc terminal voltage Vdc and the dc voltage command $V^*dc$. The d,q-axis current command limiting unit limits the d,q-axis current commands $i^*d, i^*q$ so that the d,q-axis current commands $i^*d, i^*q$ do not exceed a prescribed value.

The voltage command generator 520 generates d,q-axis voltage commands $v^*d, v^*q$ based on a detected input current ii and d,q-axis current commands $i^*d, i^*q$. The voltage command generator 520 may include a PI controller (not shown) and a d,q-axis voltage command limiting unit (not shown). The PI controller generates d,q-axis voltage commands $v^*d, v^*q$ based on the detected input current ii and d,q-axis current commands $i^*d, i^*q$. The d,q-axis voltage command limiting unit limits the d,q-axis voltage commands $v^*d, v^*q$ so that the d,q-axis voltage commands $v^*d, v^*q$ do not exceed a prescribed value.

The switching control signal output unit 530 outputs a switching control signal Scc to drive the switching elements for the converter based on the d,q-axis voltage commands $v^*q, v^*q$. The switching control signal Scc is applied to the gate terminal of the switching elements included in the converter 210 to control On/Off operations of the switching elements.

FIG. 6 is a block diagram illustrating a controller according to an exemplary embodiment of the present invention.

Referring to FIG. 6, the controller 230 may function as an inverter micom that controls the inverter 220. The controller 230 may further include a speed evaluator 605, a current command generator 610, a voltage command generator 620, and a switching control signal output unit 630.

The speed evaluator 605 evaluates the speed v of rotator of the motor based on the detected output current io.

The current command generator 610 generates d,q-axis current commands $i^*d, i^*q$ based on the evaluated speed v and a speed command $v^*$. The speed command $v^*$ corresponds to the above-mentioned final target frequency fe. The current command generator 610 may include a PI controller (not shown) and a d,q-axis current command limiting unit (not shown). The PI controller generates d,q-axis current commands $i^*d, i^*q$ based on the evaluated speed v and the speed command $v^*$. The d,q-axis current command limiting unit limits the d,q-axis current commands $i^*d, i^*q$ so that the d,q-axis current commands do not exceed a prescribed value.

The voltage command generator 620 generates d,q-axis voltage commands $v^*d, v^*q$ based on a detected output current io and d,q-axis current commands $i^*d, i^*q$. The voltage command generator 620 may include a PI controller (not shown) and a d,q-axis voltage command limiting unit (not shown). The PI controller generates d,q-axis voltage commands $v^*d, v^*q$ based on the detected output current io and d,q-axis current commands i*d,i*q. The d,q-axis voltage command limiting unit limits the d,q-axis voltage commands v*d,v*q so that the d,q-axis voltage commands v*d,v*q do not exceed a prescribed value.

The switching control signal output unit 630 outputs a switching control signal Sic to drive the switching elements for the inverter based on the d,q-axis voltage commands v*q, v*q. The switching control signal Sic is applied to the gate terminal of the switching elements included in the inverter 220 to control On/Off operations of the switching elements.

FIG. 7 is a flowchart illustrating a method of controlling a motor for an air conditioner according to an exemplary embodiment of the present invention.

Referring to FIG. 7, a current id is detected, which flows in the motor controller of the air conditioner (step S705). The detected current id may be at least one of input current ii, dc terminal current idc, and output current io.

Next, temperature in the motor controller or temperature ambient to the motor controller is detected (step S710). The detected temperature Td may be temperature of the inverter switching elements, temperature of a heat spreader mounted in the inverter, temperature of the coolant discharged from the compressor, temperature of the converter switching elements, temperature of the outdoor unit, temperature of the outdoor heat exchanger, temperature of the inlet of the pipe connected to the outdoor heat exchanger, and temperature of the outlet of the pipe connected to the outdoor heat exchanger.

The loading Lq is calculated based on at least one of room temperature Ti, setup temperature Ts, and indoor unit capacity Qi (step S715). The loading Lq increases as the difference between the setup temperature Ts and the room temperature Ti increases or the inner unit capacity Qi increases. The loading Lq may be also calculated further considering outdoor temperature To. The loading Lq may be calculated so that as the outdoor temperature To increases, the loading Lq increases accordingly, and as the outdoor temperature To decreases, the loading Lq decreases accordingly.

Then, the final target frequency is set up based on the calculated loading and at least one of the detected current and detected temperature (step S720). The setup of the final target frequency will be detailed later with reference to FIGS. 8 and 9.

FIG. 8 is a flowchart illustrating a method of setting up the final target frequency of FIG. 7 according to an exemplary embodiment of the present invention.

Referring to FIG. 8, first, the first target frequency f1 is set up based on the calculated loading Lq (step S805). The first target frequency f1 is set up so that as the loading Lq increases, the first target frequency f1 increases accordingly, and as the loading Lq decreases, the first target frequency f1 decreases accordingly. In addition, the first target frequency f1 may be set up in proportion to the loading Lq or such that the loading Lq is sectionalized and the first target frequency f1 changes for each section of the sectionalized loading Lq.

Then, the second target frequency f2 is set up based on at least one of the detected current and detected temperature (step S810). The second target frequency f2 is set up to be lowered in a case where the detected current id is larger than a prescribed value. In addition, the second target frequency f2 may be set up in inverse-proportion to the loading Lq or such that the detected current id is sectionalized and the second target frequency f2 changes for each section of the sectionalized current id. The second target frequency f2 may be set up to be equal to the first target frequency f1 in case that the detected current id is lower than a prescribed value.

If the detected current id is larger than a prescribed value, power consumption increases, the circuit elements included in the converter 210 and inverter 220 may be damaged, and it could be difficult for the motor to operate at the setup target frequency. Therefore, the second target frequency f2 may be set up to be lowered.

The second target frequency f2 may be set up to be lowered in a case where the detected temperature Td is larger than a prescribed value. The setup of the second target frequency f2 according to the detected temperature Td is similar to the setup of the second target frequency f2 according to the detected current id.

The second target frequency setup unit 330 may set up the second target frequency f2 based on both the detected current id and the detected temperature Td. The second target frequency f2 may be set up corresponding to at least one of the detected current id and the detected temperature Td using a table stored previously in the second target frequency setup unit.

Next, the lower one of the first target frequency f1 and the second target frequency f2 is set up as the final target frequency fe (step S815). The first target frequency f1 and the second target frequency f2 is compared to each other and the lower one of the two frequencies f1 and f2 is set up as the final target frequency fe. Accordingly, the final target frequency fe may be set up considering the temperature in the motor controller or the temperature Td ambient to the motor controller as well as the current id flowing in the motor controller, and therefore, the circuit elements included in the motor controller may be adapted to stably operate without respect to the current Id and temperature Td.

FIG. 9 is a flowchart illustrating a method of setting up the final target frequency of FIG. 7 according to an exemplary embodiment of the present invention.

Referring to FIG. 9, the step S905 is identical to the step S805 of FIG. 8.

Next, the amount of correction fc is set up based on the detected current and the detected temperature (step S910). The amount of correction fc is set up to increase in case that the detected current id or the detected temperature Td is larger than a prescribed value. The amount of correction fc may be less than 0. In a case where the detected current id or the detected temperature Td is smaller than a prescribed value, the amount of correction fc may be equal to 0. As described above with reference to FIG. 8, the current id or temperature Td may be sectionalized to have a few sections, and then, the amount of correction fc may be set up for each section of the sectionalized current id or temperature Td.

The amount of correction fc may be set up considering both the current id and temperature Td. The amount of correction fc may be set up corresponding to at least one of the current id and the temperature Td using the table stored previously in the target frequency correction unit.

Next, the final target frequency fe is set up based on the first target frequency f1 and the amount of correction fc (step S915). The final target frequency fe is set up by summing the first target frequency f1 and the amount of correction fc.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

INDUSTRIAL APPLICABILITY

The motor controller for the air conditioner and the motor control method according to exemplary embodiments of the present invention may be used to set up a target frequency of the motor based on the temperature and current of the motor controller in order to prevent overheating of circuit elements.

The invention claimed is:

1. A motor controller for an air conditioner, comprising:
 a converter adapted to convert AC power into DC power;
 an inverter having a plurality of switching elements and adapted to receive the DC power, convert the received DC power into AC power by switching operations of the switching elements, and supply the AC power to a motor;
 a current detector adapted to detect a current flowing in the motor controller;
 a temperature detector adapted to detect a temperature in the motor controller or a temperature ambient to the motor controller; and
 a controller adapted to:
 calculate a loading based on at least one of room temperature, setup temperature, and inner unit capacity, and
 set a final target frequency at which to drive the motor based on the calculated loading and at least one of the detected current and the detected temperature, and
 wherein the controller comprises:
 a first target frequency setup unit adapted to set up a first target frequency based on the calculated loading;
 a second target frequency setup unit adapted to set up a second target frequency based on at least one of the detected current and the detected temperature; and
 a final target frequency setup unit adapted to set up the final target frequency, wherein the final target frequency is a lower one of the first target frequency and the second target frequency.

2. The motor controller of claim 1, wherein the second target frequency setup unit is adapted to reduce the second target frequency when the detected current is larger than a predetermined value.

3. The motor controller of claim 1, wherein the second target frequency setup unit is adapted to reduce the second target frequency when the detected temperature is greater than a predetermined value.

4. The motor controller of claim 1, further comprising a table stored in the second target frequency setup unit, wherein the second target frequency setup unit is adapted to set up the second target frequency as a function of at least one of the detected current and the detected temperature using data stored in the table.

5. The motor controller of claim 1, wherein the current detector is adapted to detect an input current flowing at an input terminal of the converter.

6. The motor controller of claim 1, wherein the current detector is adapted to detect a dc terminal current flowing at an output terminal of the converter.

7. The motor controller of claim 1, wherein the current detector is adapted to detect an output current flowing at an output terminal of the inverter.

8. The motor controller of claim 1, wherein the temperature detector is adapted to detect a temperature of the switching elements included in the inverter.

9. The motor controller of claim 1, wherein the temperature detector is adapted to detect a temperature of the inverter.

10. The motor controller of claim 1, wherein the temperature detector is adapted to detect a temperature of coolant discharged from a compressor coupled to the motor.

11. A method of controlling a motor using a motor controller for an air conditioner, the motor controller comprising a converter converting AC power into DC power and an inverter having a plurality of switching elements, the inverter receiving the DC power and converting the received DC power into AC power by switching operations of the switching elements, and supplying the AC power to a motor, the method comprising:
 detecting a current flowing in the motor controller;
 detecting a temperature in the motor controller or a temperature ambient to the motor controller;
 calculating a loading based on at least one of room temperature, setup temperature, and inner unit capacity; and
 setting up a final target frequency at which to drive the motor based on the calculated loading and at least one of the detected current and the detected temperature, and
 wherein setting up the final target frequency comprises:
 setting up a first target frequency based on the calculated loading;
 setting up a second target frequency based on at least one of the detected current and the detected temperature; and
 setting up the lower one of the first target frequency and the second target frequency as the final target frequency.

12. The method of claim 11, wherein the second target frequency is reduced when the detected current is larger than a predetermined value.

13. The method of claim 11 wherein the second target frequency is reduced when the detected temperature is larger than a predetermined value.

14. The method of claim 11, wherein the second target frequency is derived from a table stored previously in a second target frequency setup unit and is a function of at least one of the detected current and the detected temperature.

* * * * *